R. B. DISBROW.
FRICTION CLUTCH.
APPLICATION FILED NOV. 25, 1911.
1,037,876.
Patented Sept. 10, 1912.
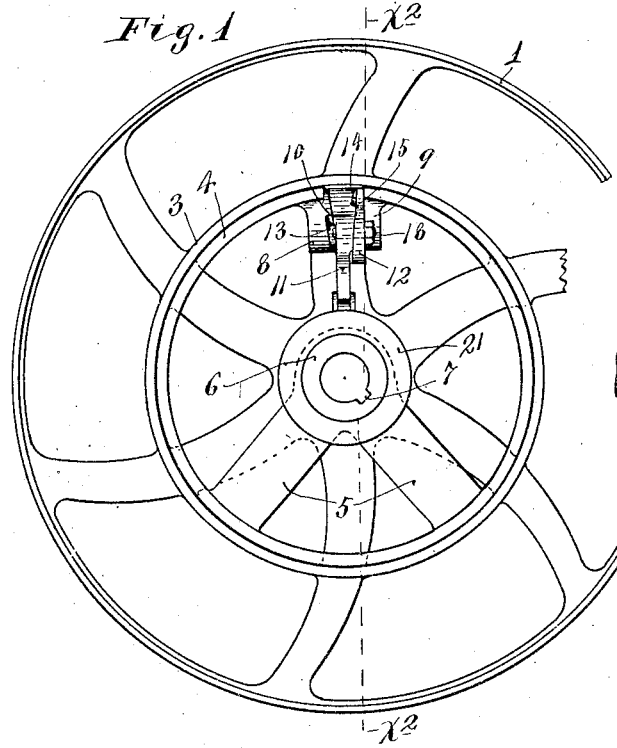
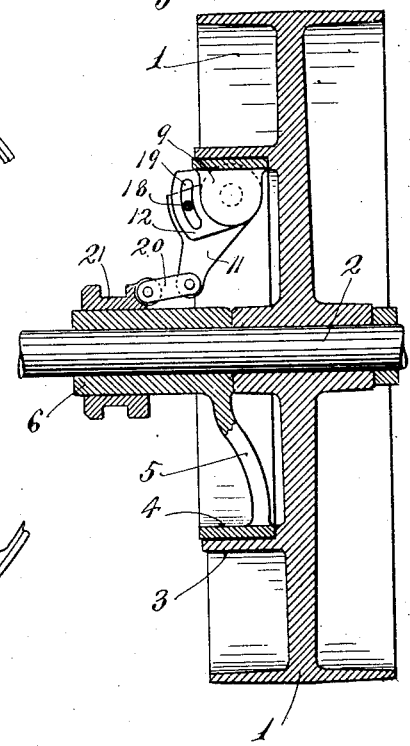
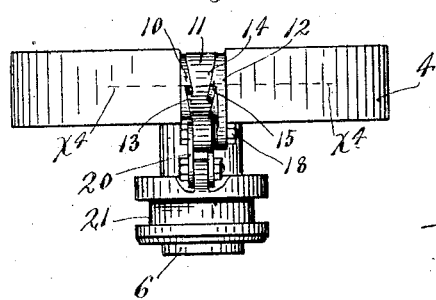
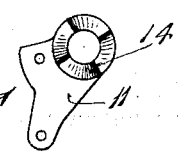
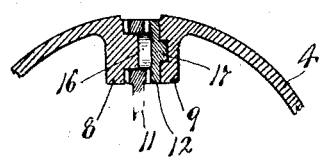
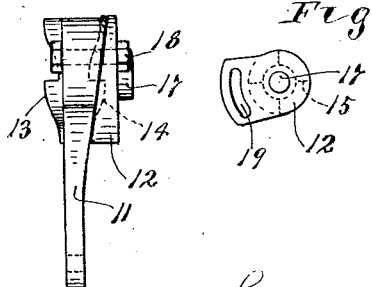
Witnesses.
A. H. Opsahl.
Harry Opsahl
Inventor.
Reuben B. Disbrow
By his Attorneys
Williamson Merchant

UNITED STATES PATENT OFFICE.

REUBEN B. DISBROW, OF OWATONNA, MINNESOTA.

FRICTION-CLUTCH.

1,037,876.  Specification of Letters Patent.  Patented Sept. 10, 1912.

Application filed November 25, 1911. Serial No. 662,410.

*To all whom it may concern:*

Be it known that I, REUBEN B. DISBROW, a citizen of the United States, residing at Owatonna, in the county of Steele and State of Minnesota, have invented certain new and useful Improvements in Friction-Clutches; and I do hereby declare the following to be a full, clear, and exact description of the invention, such as will enable others skilled in the art to which it appertains to make and use the same.

My invention relates to friction clutches of that type wherein a split ring or band is frictionally engaged with a coöperating cylindrical friction surface, by means of a lever having a wedging action on the said ring or band to expand or force the same into action.

The invention resides in improved means for adjusting the ring expanding wedge of the clutch setting lever. It should be here stated, that in this invention the term "clutch" is used in a sense broad enough to include a friction brake.

Generally stated, the invention consists of the novel construction and combination of parts illustrated, described and defined in the claims.

In the accompanying drawings which illustrate the invention, like characters indicate like parts throughout the several views.

Referring to the drawings, Figure 1 is a side elevation with some parts broken away, showing the invention incorporated in a friction clutch for transmitting motion from a pulley to a shaft, or vice versa; Fig. 2 is a vertical section taken approximately on the line $x^2\ x^2$ of Fig 1; Fig. 3 is a plan view showing the expansible clutch ring or band removed from working position and having an improved wedge acting expanded lever connected thereto; Fig. 4 is a section taken on line $x^4\ x^4$ of Fig. 3, some parts being broken away; Fig. 5 is a side elevation of the expanded lever; Fig. 6 is a side elevation of the supplemental adjustable section of the lever removed from the main member of said lever; and Fig. 7 is a view looking at the composite complete expanded lever in the direction indicated by the arrow marked in Fig. 5.

The numeral 1 indicates a pulley which, in the illustration given in the drawings, is loose on a shaft 2, and is provided at one side with a laterally projecting cylindrical clutch flange or ring 3.

The numeral 4 indicates the circumferentially expansible split friction ring member or band which, as shown, is secured to the spokes 5 of the hub 6, which hub is rigidly secured to the shaft 2 by a key 7 or other suitable means.

By reference, particularly, to Fig. 1, it will be noted that the spokes 5 of the hub 6 are but two in number and are located remote from the ends of the expansible clutch ring 4 so that the said ring, while connected for rotation with the hub, may be easily expanded. The normal spring in the ring 5 disengages the same from coöperative frictional surface of the pulley flange 3. At its ends, the expansible ring 4 is provided with inwardly projecting lugs or end enlargements 8 and 9 which are spaced apart so that the expanding lever may be interposed between them. The inner face of the lug 8 is provided with ratchet-like wedge surfaces 10, but the inner surface of the lug 9 is flat.

The improved expanding lever is made up of a main section 11 and a supplemental section 12. The lever member 11 is provided on one face of its hub with ratchet-like wedge surfaces 13 that engage with the wedge surfaces 10 of the lug 8, and on the other face of its hub it is provided with ratchet-like wedge surfaces 14 that engage with the ratchet-like surfaces 15 of the said supplemental member 12. The hub of the lever member 11 is provided with a perforation adapting it to work pivotally on a short trunnion 16 shown as formed integral with the lug 8. The supplemental member 12 is provided with a short trunnion 17 that is pivotally mounted in the seat formed in the lug 9. In this way, the lever made up of the members 11 and 12 is pivotally supported between and connected to the lugs 8 and 9 of the expansible clutch ring 4. The member 12 is pivotally adjustable in respect to the main member 11 and is adapted to be rigidly secured where set, by a short nutted bolt 18. This bolt 18 is passed through perforations in the member 11 and works through a slot 19 in the member 12. By reference to Figs. 1 and 7, it will be seen that the radially projecting portion of the member 12 in which the slot 19 is located, is made wedge-shaped and that its inclined face engages an inclined face formed on the abutting portion of the member 11. As is evident, when the supplemental member 12 is adjusted pivotally in one direction in respect to the member 11, the total thickness of the cam acting portion of said lever will be increased, when the said parts are given reverse relative adjustments, the thickness of the hub portion of the said lever will be decreased. When the members 11 and 12 are rigidly secured in the desired adjustments, they will properly set the clutch members 4 and 3 in frictional engagement when the free end of the said composite lever is moved pivotally from the position shown in Fig. 2 toward the right. This latterally expansible or adjustable expanding lever may, therefore, be primarily set for proper action and when wear takes place between the frictionally engaging portions of the clutch members 3 and 4, the said lever may be adjusted and increased in thickness in its hub portion so as to compensate for such wear. The setting of the clutch, as stated, is, of course, due to the cam action between the wedge surfaces 10 and 13, respectively, of a lug 8 and main lever member 11. For securing such adjustments to the expanded lever, the free end of the member 11 is shown as connected by a link 20 in an ordinary grooved shipper collar 21, which is adapted to be moved by suitable connections, as shown.

The device above described is extremely simple, highly efficient for the purposes had in view and may be applied at extremely small cost. It is, as already indicated, adapted for use in what is generally designated as friction clutches, and is also adapted for use in friction brakes of the same general character.

What I claim is:

1. A clutch ring expanding member made up of main and supplemental sections connected and provided with wedge surfaces for varying the thickness of the said expanding member when one of the said sections is adjusted in respect to the other.

2. A clutch ring expanding lever made up of main and supplemental sections pivotally connected and provided with wedge surfaces for varying the thickness of the lever when one of the said members is adjusted in respect to the other.

3. A clutch ring expanding lever made up of main and supplemental sections having engaging wedge surfaces for varying the thickness of the said lever, one of the said members having a segmental slot, and a bolt coöperating with the said slot to secure the said members in different adjustments in respect to each other.

4. In a friction clutch, the combination with an expansible clutch ring, of a ring expanding lever pivotally connected between the ends of the said ring and having wedge surfaces engaging the same, and which lever is made up of main and supplemental sections having engaging wedge surfaces for expanding the operative portion of the said lever, and means for securing the said main and supplemental lever sections in different adjustments.

5. In a friction clutch, the combination with an expansible clutch ring having a recess and a boss, of a ring expanding lever pivotally connected between the ends of the said ring and having wedge surfaces engaging the same, and which lever is made up of main and supplemental sections having engaging wedge surfaces for expanding the operative portion of said lever and means for securing the said main and supplemental lever sections in different adjustments, and the said lever having on one side a projecting boss and on the other side a recess engageable, respectively, with the recess and boss formed on the ends of the said ring.

In testimony whereof I affix my signature, in presence of two witnesses.

REUBEN B. DISBROW.

Witnesses:
BERNICE G. WHEELER,
HARRY D. KILGORE.